UNITED STATES PATENT OFFICE.

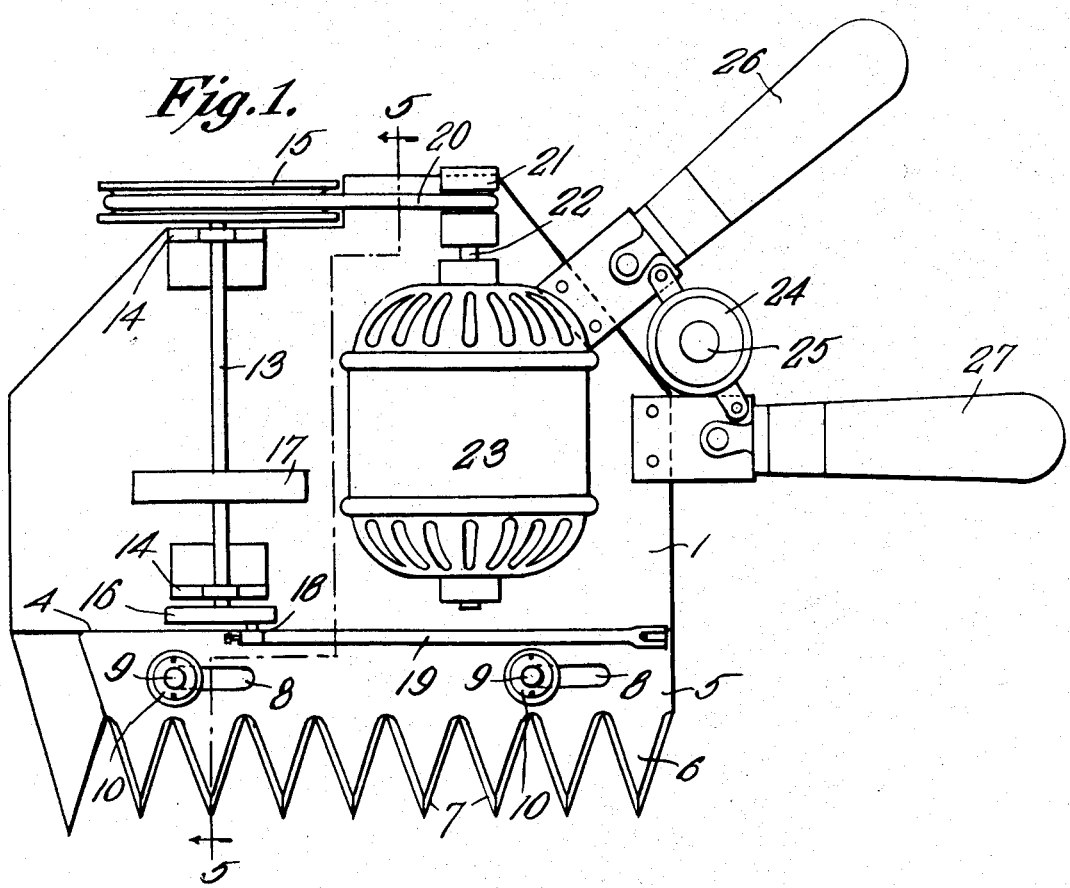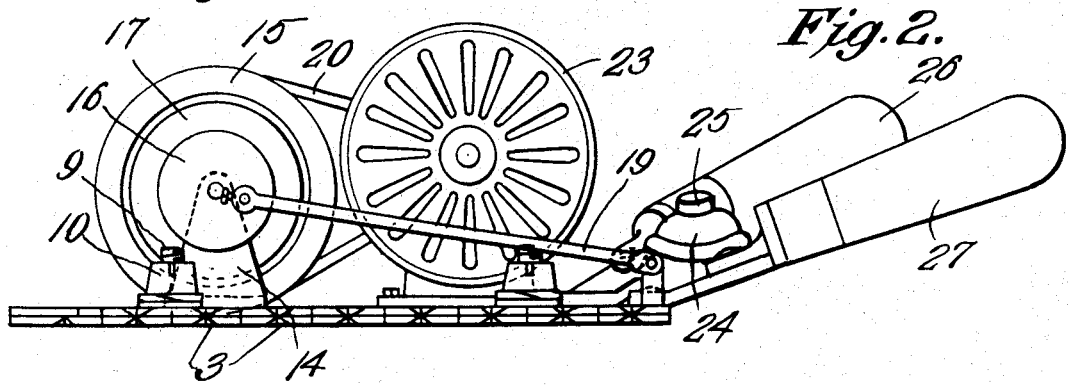

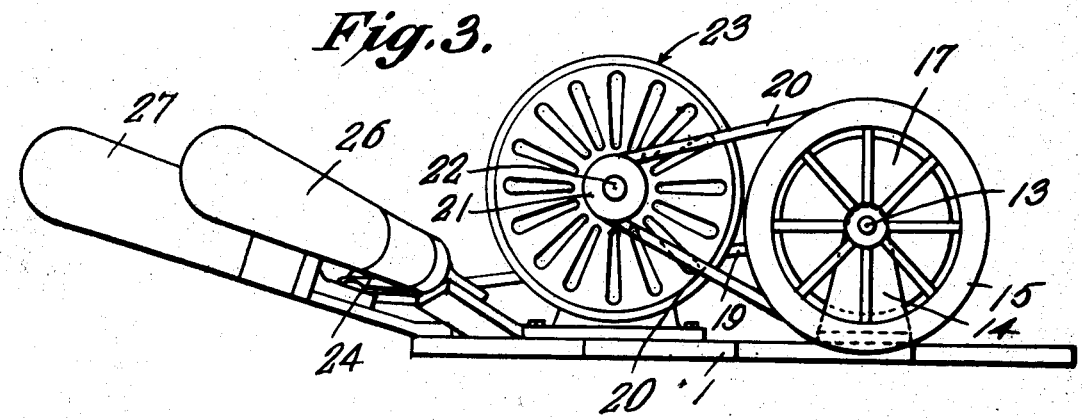
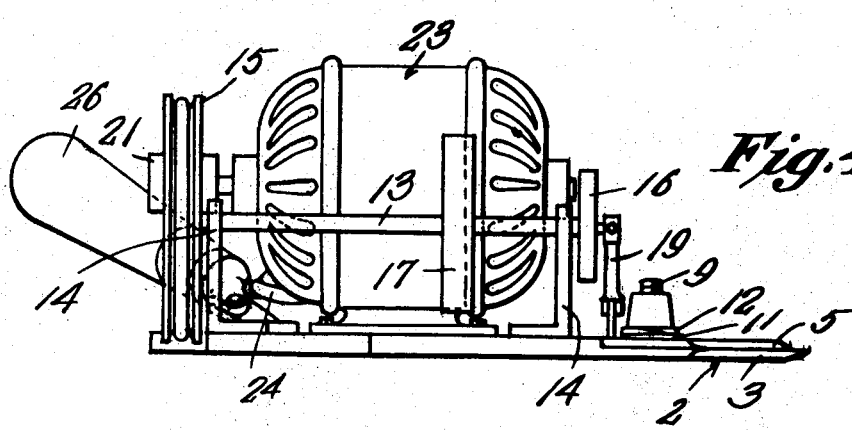
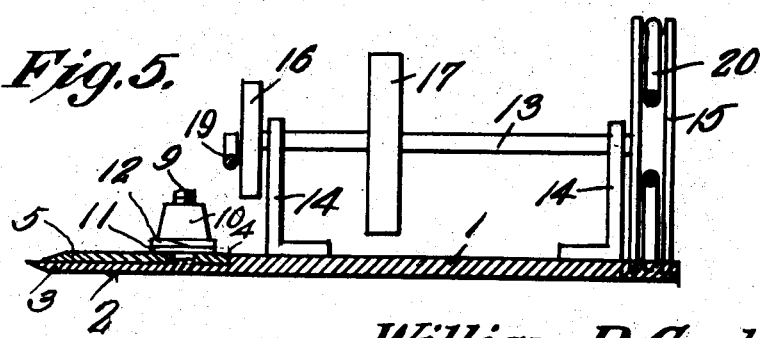

WILLIAM R. COMBOUZOU, OF BATON ROUGE, LOUISIANA.

HEDGE-TRIMMER.

1,265,178.  Specification of Letters Patent.  Patented May 7, 1918.

Application filed August 27, 1917. Serial No. 188,484.

*To all whom it may concern:*

Be it known that I, WILLIAM R. COMBOUZOU, a citizen of the United States, residing at Baton Rouge, in the county of East Baton Rouge and State of Louisiana, have invented certain new and useful Improvements in Hedge-Trimmers, of which the following is a specification.

This invention relates to hedge trimmers and more particularly to electrically operated machines of this character.

The object of the invention is to so construct an implement of this character that it may be easily manipulated and which will accomplish a maximum amount of work with a minimum consumption of time.

Another object is to so construct an implement of this character that it will be light and inexpensive to manufacture and which will occupy a small space when not in use.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a hedge trimmer constructed in accordance with this invention, Fig. 2 is a side elevation thereof, Fig. 3 is a similar view taken from the side opposite to that shown in Fig. 2, Fig. 4 is a front elevation, and Fig. 5 is a transverse section taken on the line 5—5 of Fig. 1.

In the embodiment illustrated a base plate 1 is shown having a fixed blade 2 carried by one side edge thereof and provided with cutting teeth 3. This blade 2 is preferably made integral with the plate 1 as shown in Fig. 5 and has a shoulder 4 at the base of its cutting teeth which operates as a guide for the movable blade 5 mounted to reciprocate longitudinally on blade 2. This blade 5 also has teeth 6 which conform in shape and size to the teeth of blade 2 and are beveled as shown at 7 to provide cutting edges. This blade 5 has a plurality of longitudinally extending slots 8, two being here shown which are designed to fit over and be guided by threaded studs 9 which project upwardly from the blade 2 near its base or inner edge. This movable blade 5 is held in sliding relation on blade 2 by means of nuts 10, washers 11 and springs 12, the springs and washers being disposed between the nuts and outer face of blade 5 as is shown clearly in Fig. 5.

Extending transversely of plate 1 near the front end thereof is a shaft 13 mounted to rotate in standards 14, rising from plate 1 as is shown clearly in Fig. 5. A pulley 15 is carried by one end of the shaft 13 while a crank disk 16 is carried by its other end and a fly wheel 17 is disposed thereon between said pulley and crank disk. A wrist pin 18 projects laterally and concentrically from the outer face of disk 16 and is engaged with one end of a pitman 19, the other end of said pitman being connected with the movable blade 5 near its rear end as is shown clearly in Figs. 1, 2 and 4. The pitman 19 as shown in Fig. 1 is arranged longitudinally of said blade 5 so that when the shaft 13 is turned, a reciprocatory motion will be imparted to said blade, causing the cutting teeth thereof to slidably move over the cutting teeth of the stationary blade 2 for trimming grass, twigs and the like with which the device is engaged.

A driving belt 20 passes around pulley 15 and over a coöperating pulley 21 carried by a shaft 22 of an electric motor 23, said motor being supported in suitable bearings on plate 1. This motor may be of any suitable or desired construction and as the details thereof constitute no part of this invention they will not be herein described.

A switch 24 controlled by a push button 25 is mounted between two handles 26 and 27 which project laterally from one end of the base plate 1, and the switch is connected with the motor so that when the button is depressed the motor will be started and the shaft 22 thereof rotated and through belt 20 will drive shaft 13 and reciprocate blade 5 to effect a cutting operation.

The handles 26 and 27 are here shown arranged in diverging relation although obviously they need not be so positioned, but such arrangement facilitates the operation of the machine enabling the handles to be more readily grasped by both hands of the user. The handle 27 is shown disposed in a plane parallel with the cutting blades while handle 26 is arranged at an oblique angle thereto to provide for the easy and convenient manipulation of the trimmer and for the positioning between said handles of the switch operating push button so that it may be actuated by the thumb of either hand.

In the use of this device, the handles 26 and 27 are grasped by both hands of the operator so that the push button 25 will be positioned for depression by either thumb. When this button is depressed, the switch is closed and the motor thrown into operation and it continues to rotate and operate the cutting blade 5 until said button is released when it instantly stops. It will thus be seen that by actuating the cutting blades over the hedge to be trimmed, the twigs will be cut and the surface may be shaped to conform to the wishes of the operator and owing to the rapid reciprocation of blade 5 under the action of the motor 23 a maximum amount of work may be accomplished with a minimum consumption of time.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A trimmer of the class described comprising a base plate, a stationary blade carried thereby, a movable blade mounted to reciprocate thereon, guiding means for said movable blade carried by said fixed blade, an electric motor mounted on said plate, connections between said motor and movable blade whereby the latter is actuated by the former, handles extending laterally from said plate, and a controlling switch for said motor disposed between said handles in position for convenient actuation by either hand of the operator.

2. A trimmer of the class described comprising a base plate having a fixed cutting blade made integral with one side edge thereof and provided with a shoulder at its base to form a guide, a movable blade mounted to reciprocate longitudinally on said fixed blade and guided by said shoulder, said movable blade having longitudinally extending slots therein, threaded studs carried by said fixed blade and projecting through said slots, washers, springs and nuts on said studs for holding said movable blade in sliding relation on said fixed blade, and means for actuating said movable blade.

In testimony whereof I affix my signature in presence of two witneses.

WILLIAM R. COMBOUZOU.

Witnesses:
L. D. BEALE,
J. M. COMBOUZOU.